US012639781B2

(12) United States Patent
Ransom et al.

(10) Patent No.: US 12,639,781 B2
(45) Date of Patent: May 26, 2026

(54) REDUCING IMAGE SCALING ARTIFACTS VIA TILE SIZE SELECTION

(71) Applicant: Synaptics Incorporated, San Jose, CA (US)

(72) Inventors: Scott Liam Ransom, Cambridge (GB); Paul James, Bourne (GB); Timothy John Borer, Cambridge (GB)

(73) Assignee: Synaptics Incorporated, San Jose, CA (US)

( * ) Notice: Subject to any disclaimer, the term of this patent is extended or adjusted under 35 U.S.C. 154(b) by 493 days.

(21) Appl. No.: 18/057,368

(22) Filed: Nov. 21, 2022

(65) Prior Publication Data

US 2024/0169478 A1      May 23, 2024

(51) Int. Cl.
    *G06T 3/40*          (2024.01)
    *G06T 7/10*          (2017.01)
(52) U.S. Cl.
    CPC ................. *G06T 3/40* (2013.01); *G06T 7/10* (2017.01); *G06T 2207/20021* (2013.01)
(58) Field of Classification Search
    CPC ....... G06T 7/10–11; G06T 2207/20021; G06T 3/4038; G06T 3/40–4023;
                                (Continued)

(56) References Cited

U.S. PATENT DOCUMENTS

2004/0196408 A1 * 10/2004 Ishikawa .............. H04N 25/618
                                                        348/E5.079
2008/0025625 A1 * 1/2008 Ishizaka ................ G06T 3/4007
                                                        382/248
                        (Continued)

FOREIGN PATENT DOCUMENTS

CA          2329426 A1 * 10/1999 ....... H04N 21/23435
GB          2598918 A  * 3/2022  .......... G06T 3/4053
                        (Continued)

OTHER PUBLICATIONS

Yongbing Zhang, "Interpolation-Dependent Image Downsampling", Nov. 2011 (Year: 2011).*
                        (Continued)

*Primary Examiner* — Andrew W Bee
*Assistant Examiner* — Caleb L Esquino
(74) *Attorney, Agent, or Firm* — Paradice & Li LLP

(57)                ABSTRACT

This disclosure provides methods, devices, and systems for image scaling. The present implementations more specifically relate to downscaling techniques that preserve a subset of pixel values in a digital image so that all reconstructed pixel values in the upscaled image can be interpolated based on two or more preserved pixel values. In some aspects, an image downscaler may partition a digital image into a number of image tiles based on a base tile size and one or more scaling factors associated with a downscaling operation used to downscale each image tile. The base tile size indicates the dimensions of the downscaled tiles. The one or more scaling factors indicate distances between the pixel values preserved as a result of one or more iterations, respectively, of the downscaling operation, where each iteration preserves a smaller subset of the pixel values from the original image (as a lower resolution tile).

20 Claims, 7 Drawing Sheets

(58) Field of Classification Search
CPC ........ G06T 2207/20016; H04N 19/119; H04N 19/865; H04N 19/17–176; H04N 19/59
See application file for complete search history.

(56) References Cited

U.S. PATENT DOCUMENTS

| | | | | |
|---|---|---|---|---|
| 2012/0219238 | A1* | 8/2012 | Liu | G06T 3/00 |
| | | | | 382/291 |
| 2015/0156501 | A1* | 6/2015 | Hannuksela | H04N 19/70 |
| | | | | 375/240.12 |
| 2018/0295368 | A1* | 10/2018 | Shen | H04N 19/154 |
| 2020/0219285 | A1* | 7/2020 | Faramarzi | H04L 65/70 |
| 2020/0250097 | A1* | 8/2020 | Holland | G06F 12/1009 |
| 2022/0067429 | A1* | 3/2022 | Kwon | G06N 3/0464 |

FOREIGN PATENT DOCUMENTS

| | | | |
|---|---|---|---|
| JP | H11328386 A | * | 11/1999 |
| JP | 2001230929 A | * | 8/2001 |

OTHER PUBLICATIONS

Jaana Parkkinen, " A Fast Method for Scaling Color Images", Aug. 2009 (Year: 2009).*
Ioannis Andreadis, "Digital Image Scaling", May 2005 (Year: 2005).*
Chun-Ho Kim, "Winscale: An Image-Scaling Algorithm Using an Area Pixel Model", Jun. 2003 (Year: 2003).*
GB Search Report dated Jun. 5, 2024, from GB Application No. GB2317687.8.

* cited by examiner

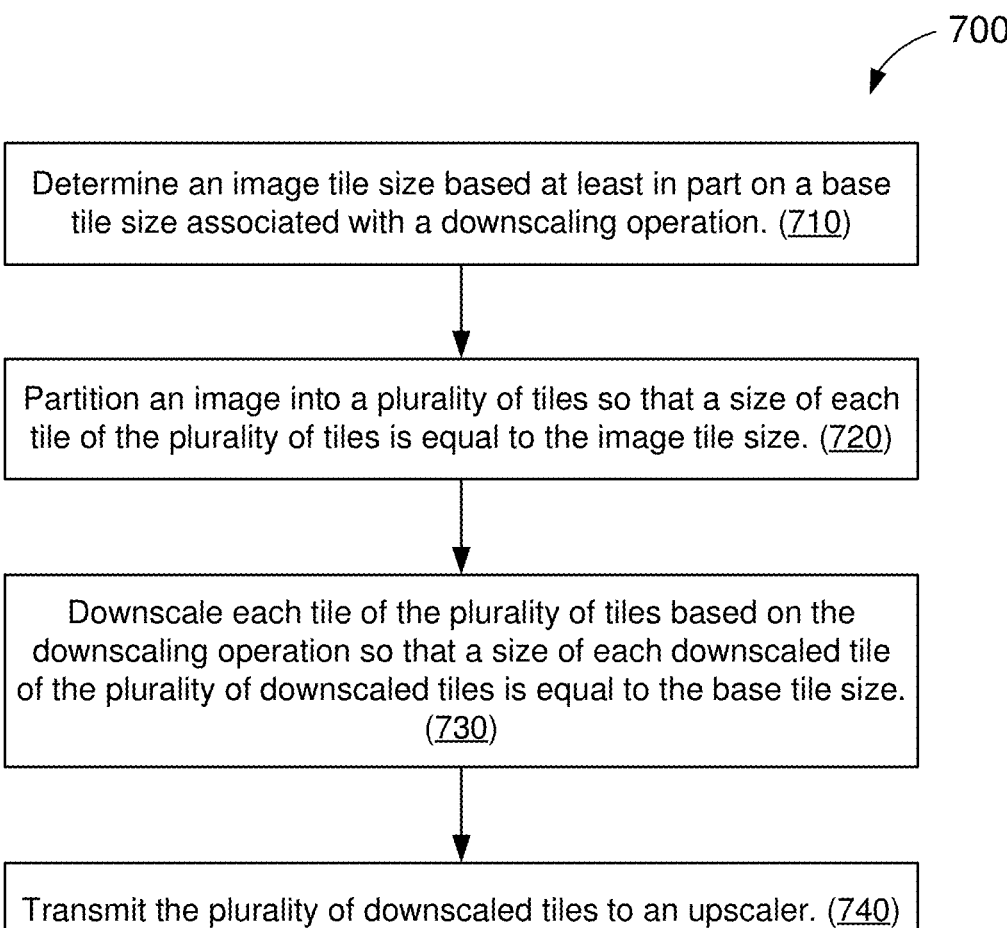

700

Determine an image tile size based at least in part on a base tile size associated with a downscaling operation. (710)

Partition an image into a plurality of tiles so that a size of each tile of the plurality of tiles is equal to the image tile size. (720)

Downscale each tile of the plurality of tiles based on the downscaling operation so that a size of each downscaled tile of the plurality of downscaled tiles is equal to the base tile size. (730)

Transmit the plurality of downscaled tiles to an upscaler. (740)

FIG. 7

REDUCING IMAGE SCALING ARTIFACTS VIA TILE SIZE SELECTION

TECHNICAL FIELD

The present implementations relate generally to image scaling, and specifically to reducing image scaling artifacts via tile size selection.

BACKGROUND OF RELATED ART

Data compression is a technique for encoding information into (generally) smaller units of data. As such, data compression can be used to reduce the bandwidth or overhead needed to store or transmit such information over a communication channel (such as a wired or wireless medium). For example, an encoder encodes or compresses the information into a sequence of coded bits (also referred to as a "codeword") and a decoder subsequently decodes or decompresses the codeword to recover the original information. Data compression techniques can be generally categorized as "lossy" or "lossless." Lossy data compression may result in some loss of information between the encoding and decoding of such information. In contrast, no information is lost as a result of encoding or decoding such information using lossless data compression.

Image scaling is a form of lossy data compression that can be used to transmit or store digital images via a communication channel. An encoder performs a downscaling operation to convert (or "downscale") a digital image from its native resolution to a lower resolution so that the downscaled image is represented by fewer pixel values than the original image. For example, the downscaled image may include a subset of the pixel values from the original image. A decoder performs an upscaling operation to convert (or "upscale") the downscaled image back to its native resolution. Because the downscaled image includes fewer pixel values than the original image, at least some pixel values in the upscaled image (also referred to as "reconstructed pixel values") must be calculated or inferred from one or more pixel values of the downscaled image (also referred to as "preserved pixel values").

A reconstructed pixel value that is located between two or more preserved pixel values can be interpolated based on the surrounding preserved pixel values (on different sides of the reconstructed pixel value). For example, an interpolated pixel value may be a weighted average of the surrounding preserved pixel values. By contrast, a reconstructed pixel value that is not located between two or more preserved pixel values must be extrapolated based on the nearest preserved pixel values (on one side of the reconstructed pixel value). As a result, extrapolated pixel values are generally less accurate than interpolated pixel values and often result in visual artifacts (such as blocking artifacts) in the upscaled image. Thus, new image scaling techniques are needed to reduce artifacts in upscaled images.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of downscaling images. The method includes steps of determining an image tile size based at least in part on a base tile size associated with a downscaling operation; partitioning an image into a plurality of tiles so that a size of each tile of the plurality of tiles is equal to the image tile size; downscaling each tile of the plurality of tiles based on the downscaling operation so that a size of each downscaled tile of the plurality of downscaled tiles is equal to the base tile size; and transmitting the plurality of downscaled tiles to an image upscaler.

Another innovative aspect of the subject matter of this disclosure can be implemented in an image downscaler that includes a processing system and a memory. The memory stores instructions that, when executed by the processing system, cause the image downscaler to determine an image tile size based at least in part on a base tile size associated with a downscaling operation; partition an image into a plurality of tiles so that a size of each tile of the plurality of tiles is equal to the image tile size; downscale each tile of the plurality of tiles based on the downscaling operation so that a size of each downscaled tile of the plurality of downscaled tiles is equal to the base tile size; and transmit the plurality of downscaled tiles to an image upscaler.

BRIEF DESCRIPTION OF THE DRAWINGS

The present implementations are illustrated by way of example and are not intended to be limited by the figures of the accompanying drawings.

FIG. 7 shows an illustrative flowchart depicting an example operation for downscaling images, according to some implementations.

DETAILED DESCRIPTION

Figure 1:
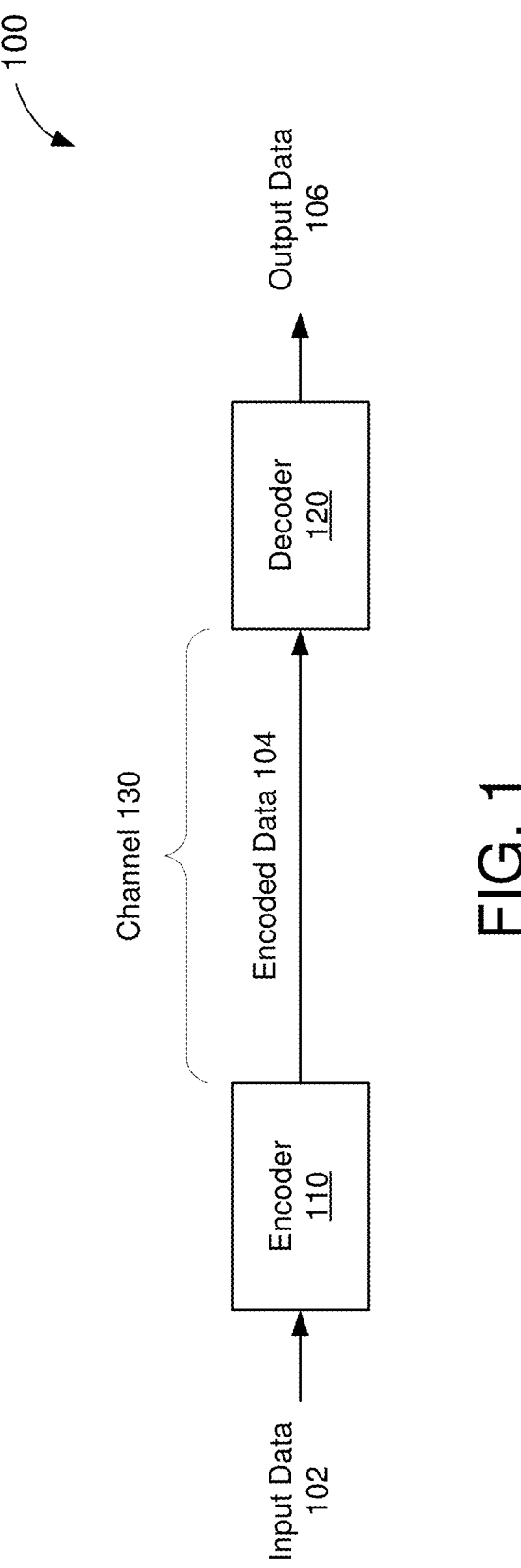
FIG. 1 shows an example communication system for encoding and decoding data.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, image scaling is a form of lossy data compression that can be used to transmit or store digital images via a communication channel. An encoder performs a downscaling operation to convert (or "downscale") a digital image from its native resolution to a lower resolution so that the downscaled image is represented by fewer pixel values than the original image. For example, the downscaled image may include a subset of the pixel values from the original image. A decoder performs an upscaling operation to convert (or "upscale") the downscaled image back to its native resolution. Because the downscaled image includes fewer pixel values than the original image, at least some pixel values in the upscaled image (also referred to as "reconstructed pixel values") must be calculated or inferred from one or more pixel values of the downscaled image (also referred to as "preserved pixel values").

A reconstructed pixel value that is located between two or more preserved pixel values can be interpolated based on the surrounding preserved pixel values (on different sides of the reconstructed pixel value). For example, an interpolated pixel value may be a weighted average of the surrounding preserved pixel values. By contrast, a reconstructed pixel value that is not located between two or more preserved pixel values must be extrapolated based on the nearest preserved pixel values (on one side of the reconstructed pixel value). As a result, extrapolated pixel values are generally less accurate than interpolated pixel values and often result in visual artifacts (such as blocking artifacts) in the upscaled image. Aspects of the present disclosure recognize that visual artifacts associated with image scaling can be reduced by increasing the proportion of interpolated pixel values (or reducing the proportion of extrapolated pixel values) in the upscaled image.

Various aspects relate generally to image scaling, and more particularly, to downscaling techniques that preserve a subset of pixel values in a digital image so that all reconstructed pixel values in the upscaled image can be interpolated based on two or more preserved pixel values. In some aspects, an image downscaler may partition a digital image into a number of image tiles based on a base tile size and one or more scaling factors associated with a downscaling operation used to downscale each image tile. The base tile size indicates the dimensions of the downscaled tiles. The one or more scaling factors indicate distances between the pixel values preserved as a result of one or more iterations, respectively, of the downscaling operation, where each iteration preserves a smaller subset of the pixel values from the original image (as a lower resolution tile). In some implementations, the image downscaler may configure the dimensions of the image tiles so that the pixel values located at the corners of each image tile (such as the top-left, top-right, bottom-left, and bottom-right corners) are preserved as a result of the downscaling operation.

Particular implementations of the subject matter described in this disclosure can be implemented to realize one or more of the following potential advantages. Aspects of the present disclosure may reduce visual artifacts associated with image scaling by avoiding extrapolated pixel values in upscaled images. For example, each downscaled tile may be upscaled using the same scaling factors and tile sizes associated with the downscaling operation used to produce the downscaled tile. As a result, the preserved pixel values in a downscaled tile map to the same locations in the upscaled tile as in the original image tile. By configuring the dimensions of the image tiles based on the base tile size and scaling factors associated with the downscaling operation, aspects of the present disclosure may control the distribution of preserved pixel values in each image tile (such as by preserving the pixel values located at the corners of each image tile) so that any reconstructed pixel values in an upscaled tile can be interpolated based on two or more of the preserved pixel values.

FIG. 1 shows an example communication system 100 for encoding and decoding data. The communication system 100 includes an encoder 110 and a decoder 120. In some implementations, the encoder 110 and the decoder 120 may be provided in respective communication devices such as, for example, computers, switches, routers, hubs, gateways, cameras, displays, or other devices capable of transmitting or receiving communication signals. In some other implementations, the encoder 110 and the decoder 120 may be included in the same device or system.

The encoder 110 receives input data 102 to be transmitted or stored via a channel 130. For example, the channel 130 may include a wired or wireless communication medium that facilities communications between the encoder 110 and the decoder 120. Alternatively, or in addition, the channel 130 may include a data storage medium. In some aspects, the encoder 110 may be configured to compress the size of the input data 102 to accommodate the bandwidth, storage, or other resource limitations associated with the channel 130. For example, the encoder 110 may encode each unit of input data 102 as a respective "codeword" that can be transmitted or stored over the channel 130 (as encoded data 104). The decoder 120 is configured to receive the encoded data 104, via the channel 130, and decode the encoded data 104 as output data 106. For example, the decoder 120 may decompress or otherwise reverse the compression performed by the encoder 110 so that the output data 106 is substantially similar, if not identical, to the original input data 102.

Data compression techniques can be generally categorized as "lossy" or "lossless." Lossy data compression may result in some loss of information between the encoding and decoding steps. As a result of lossy compression, the output data 106 may be different than the input data 102. Example lossy compression techniques may include, among other examples, transform coding (such as through application of a spatial-frequency transform) and quantization (such as through application of a quantization matrix). In contrast, lossless data compression does not result in any loss of information between the encoding and decoding steps as long as the channel 130 does not introduce errors into the encoded data 104. As a result of lossless compression, the output data 106 is identical to the input data 102. Example lossless compression techniques may include, among other examples, entropy encoding (such as arithmetic coding, Huffman coding, or Golomb coding) and run-length encoding (RLE).

Image scaling is a particular form of lossy data compression that can be used to transmit or store digital images. With reference for example to FIG. 1, the input data 102 may be an array of pixel values representing a digital image to be stored or transmitted via the channel 130. The encoder 110 may perform a downscaling operation to convert (or "downscale") the digital image from its native resolution to a lower resolution (as the encoded data 104) so that the downscaled image is represented by fewer pixel values than the original image. For example, the encoded data 104 may include a subset of the pixel values from the input data 102. The decoder 120 may perform an upscaling operation to convert (or "upscale") the downscaled image back to its native resolution (as the output data 106). Because the encoded data 104 includes fewer pixel values than the input data 102, at least some pixel values in the output data 106 (also referred to as "reconstructed pixel values") must be calculated or inferred from one or more pixel values in the encoded data 104 (also referred to as "preserved pixel values").

A reconstructed pixel value that is located between two or more preserved pixel values can be interpolated based on the surrounding preserved pixel values (on different sides of the reconstructed pixel value). For example, an interpolated pixel value may be a weighted average of the surrounding preserved pixel values. By contrast, a reconstructed pixel value that is not located between two or more preserved pixel values must be extrapolated based on the nearest preserved pixel values (on one side of the reconstructed pixel value). As a result, extrapolated pixel values are generally less accurate than interpolated pixel values and often result in visual artifacts (such as blocking artifacts) in the upscaled image. In some aspects, the encoder 110 may downscale images in a manner that avoids pixel extrapolation by the decoder 120. More specifically, the encoder 110 may select the preserved pixel values to be included in the downscaled image so that the decoder 120 can interpolate all of the reconstructed pixel values of the upscaled image based on two or more of the preserved pixel values.

Figure 2:
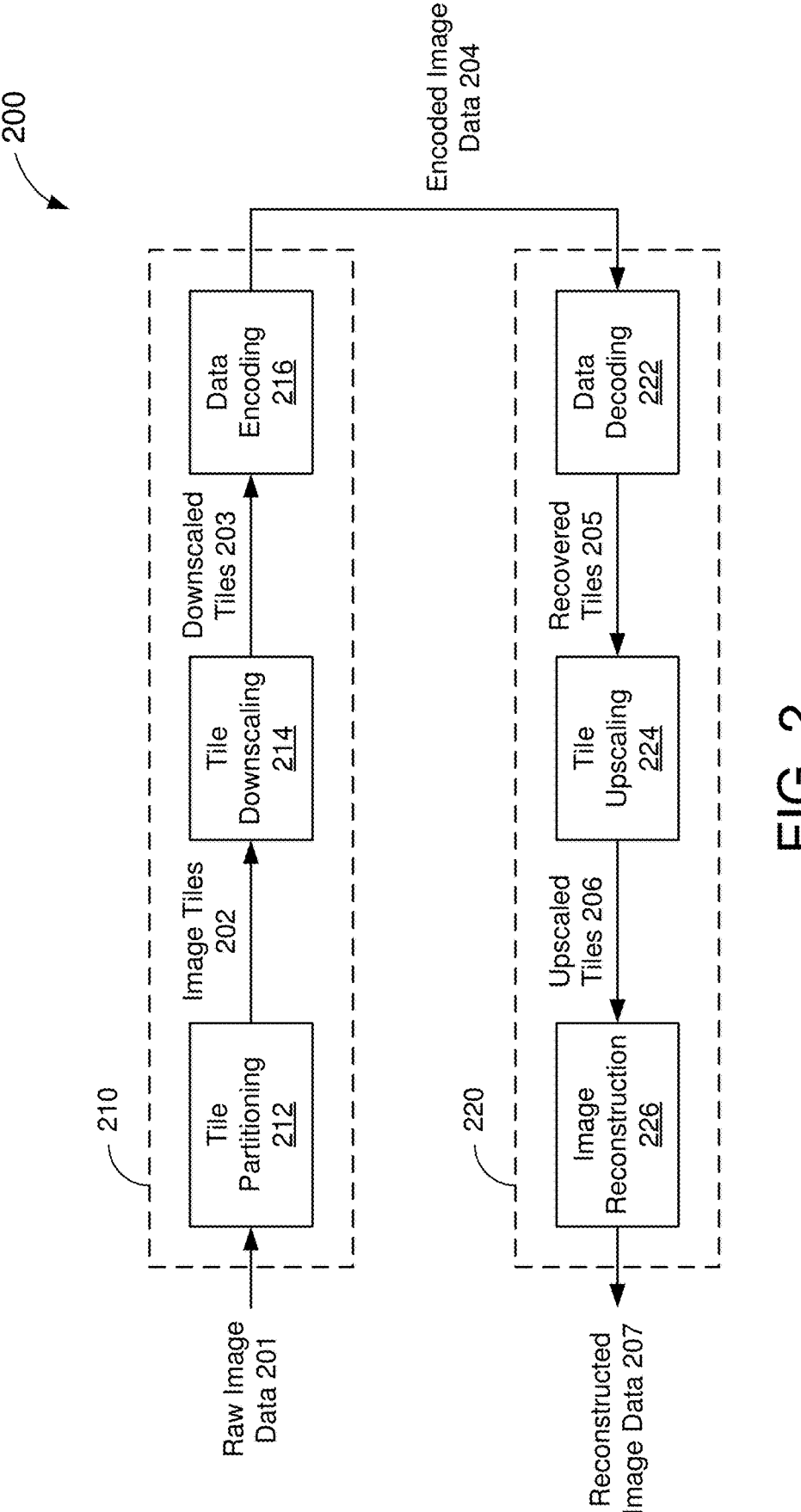
FIG. 2 shows a block diagram of an example image transmission system, according to some implementations.

FIG. 2 shows a block diagram of an example image transmission system 200, according to some implementations. The system 200 includes an image encoder 210 and an image decoder 220. In some implementations, the image encoder 210 and the image decoder 220 may be examples of the encoder 110 and the decoder 120, respectively, of FIG. 1. Thus, the image encoder 210 may be communicatively coupled to the image decoder 220 via a channel (such as the channel 130 of FIG. 1).

The image encoder 210 is configured to encode raw image data 201, as encoded image data 204, for transmission to the image decoder 220. For example, the raw image data 201 may include an array of pixel values (or multiple arrays of pixel values associated with different color channels) representing a digital image or frame of video captured or acquired by an image source (such as a camera or other image output device).

The image decoder 220 is configured to decode the encoded image data 204, as reconstructed image data 207, for display on a display device (such as a television, computer monitor, smartphone, or any other device that includes an electronic display). More specifically, the image decoder 220 may reverse the encoding performed by the image encoder 210 so that the reconstructed image data 207 is substantially similar, if not identical, to the raw image data 201.

In some implementations, the image encoder 210 may include a tile partitioning component 212, a tile downscaling component 214, and a data encoding component 216. The tile partitioning component 212 partitions or subdivides each frame of raw image data 201 into a number of image tiles 202. Each image tile 202 includes a subset (or subarray) of pixel values, from the frame of raw image data 201, representing a respective portion or region of the digital image. The tile downscaling component 214 performs a downscaling operation on each image tile 202 to produce a respective downscaled tile 203. As described with reference to FIG. 1, each downscaled tile 203 may have a lower resolution than the image tile 202 from which it is produced.

In some aspects, the downscaling operation may preserve a subset of the pixel values in each image tile 202 so that each pixel value in the resulting downscaled tile 203 is equal to a respective pixel value in the image tile 202. In some implementations, the downscaling operation may be performed over a number (K) iterations, where each iteration of the downscaling operation preserves a smaller subset of the pixel values preserved by the previous iteration and the downscaled tiles 203 are produced as a result of the $K^{th}$ iteration of the downscaling operation. The size or dimensions of the downscaled tiles 203 are referred to herein as the "base tile size" associated with the downscaling operation. The distance between pixel values preserved by each iteration of the downscaling operation is referred to herein as a "scaling factor" associated with the iteration of the downscaling operation.

The data encoding component 216 is configured to encode each of the downscaled tiles 203 as one or more codewords, of the encoded image data 204, according to one or more coding schemes. In some implementations, the data encoding component 216 may perform lossy or lossless compression on the downscaled tiles 203, for example, to further reduce the amount of encoded image data 204 transmitted over the channel (to the video decoder 220). In some other implementations, the data encoding component 216 may further encode or otherwise perform additional processing on the downscaled tiles 203. Example suitable coding techniques include spatial-frequency transformation and quantization, among other examples. Still further, in some implementations, the downscaled tiles 203 may be transmitted directly to the image decoder 220 (as encoded image data 204).

In some implementations, the video decoder 220 may include a data decoding component 222, a tile upscaling component 224, and an image reconstruction component 226. The data decoding component 222 is configured to decode each frame of encoded image data 204 as a series of recovered tiles 205. More specifically, the data decoding component 222 may reverse the encoding (if any) performed by the data encoding component 216. For example, the data decoding component 222 may decode the codewords included in each frame of encoded image data 204 (according to the same coding schemes implemented by the data encoding component 216) to recover the downscaled tiles 203 produced by the tile downscaling component 214.

The tile upscaling component 224 performs an upscaling operation on each recovered tile 205 to produce a respective upscaled tile 206. More specifically, the tile upscaling component 224 may reverse the downscaling operation performed by the tile downscaling component 214 to recover the original image tiles 202 output by the tile partitioning component 212. As described with reference to FIG. 1, the upscaled tiles 206 have the same resolution as the image tiles 202 (which is equal to the native resolution of the digital image). However, because each recovered tile 205 includes only a subset of the pixel values in a respective image tile 202, at least some of the pixel values in the upscaled tiles 206 must be calculated or inferred from one or more of the preserved pixel values in the recovered tiles 205.

The image reconstruction component 226 aggregates the upscaled tiles 206 as reconstructed image data 207. More specifically, the image reconstruction component 226 may reverse the partitioning performed by the tile partitioning component 212, for example, by reassembling the upscaled tiles 206 into a frame of reconstructed image data 207 that resembles the frame of raw image data 201 encoded by the image encoder 210. The reconstructed image data 207 can further be displayed or otherwise rendered as a digital image on an electronic display.

Aspects of the present disclosure recognize that, for a given base tile size and scaling factors associated with a downscaling operation performed by the tile downscaling component 214, the size of each image tile 202 affects the distribution of preserved pixel values inherited by the resulting downscaled tile 203. For example, if an 8×8 image tile (including 8 rows and 8 columns of pixel values) is downscaled to a 4×4 downscaled tile with a scaling factor equal to 3 (which preserves every $3^{rd}$ pixel value in the image tile), the downscaled tile will not inherit any pixel values from 2 of the edges of the 8×8 image tile (such as the $8^{th}$ row and the $8^{th}$ column of the image tile). As a result, reconstructed pixel values along such edges of the upscaled tile must be extrapolated based on the preserved pixel values. By contrast, if a 10×10 image tile is downscaled to a 4×4 downscaled tile with a scaling factor equal to 3, the downscaled tile will inherit at least one pixel value from all 4 edges (including all 4 corners) of the 10×10 image tile. As a result, all of the reconstructed pixel values of the upscaled tile can be interpolated based on the preserved pixel values.

In some aspects, the tile partitioning component 212 may configure the size or dimensions of the image tiles 202 (also referred to as the "image tile size") based on the base tile size and scaling factors associated with the downscaling operation performed by the tile downscaling component 214. More specifically, the tile partitioning component 212 may select an image tile size associated with a distribution of preserved pixel values that enables all of the reconstructed pixel values in the upscaled tiles 206 to be interpolated based on two or more preserved pixel values from the recovered tiles 205 (and thus, the downscaled tiles 203). In some implementations, the tile partitioning component 212 may select an image tile size that causes the tile downscaling component 214 to preserve at least the pixel values located at the corners of each image tile 202 as a result of performing the downscaling operation. In other words, each downscaled tile 203 may include at least 4 preserved pixel values that map to the 4 corners, respectively, of an image tile 202.

Figure 3:
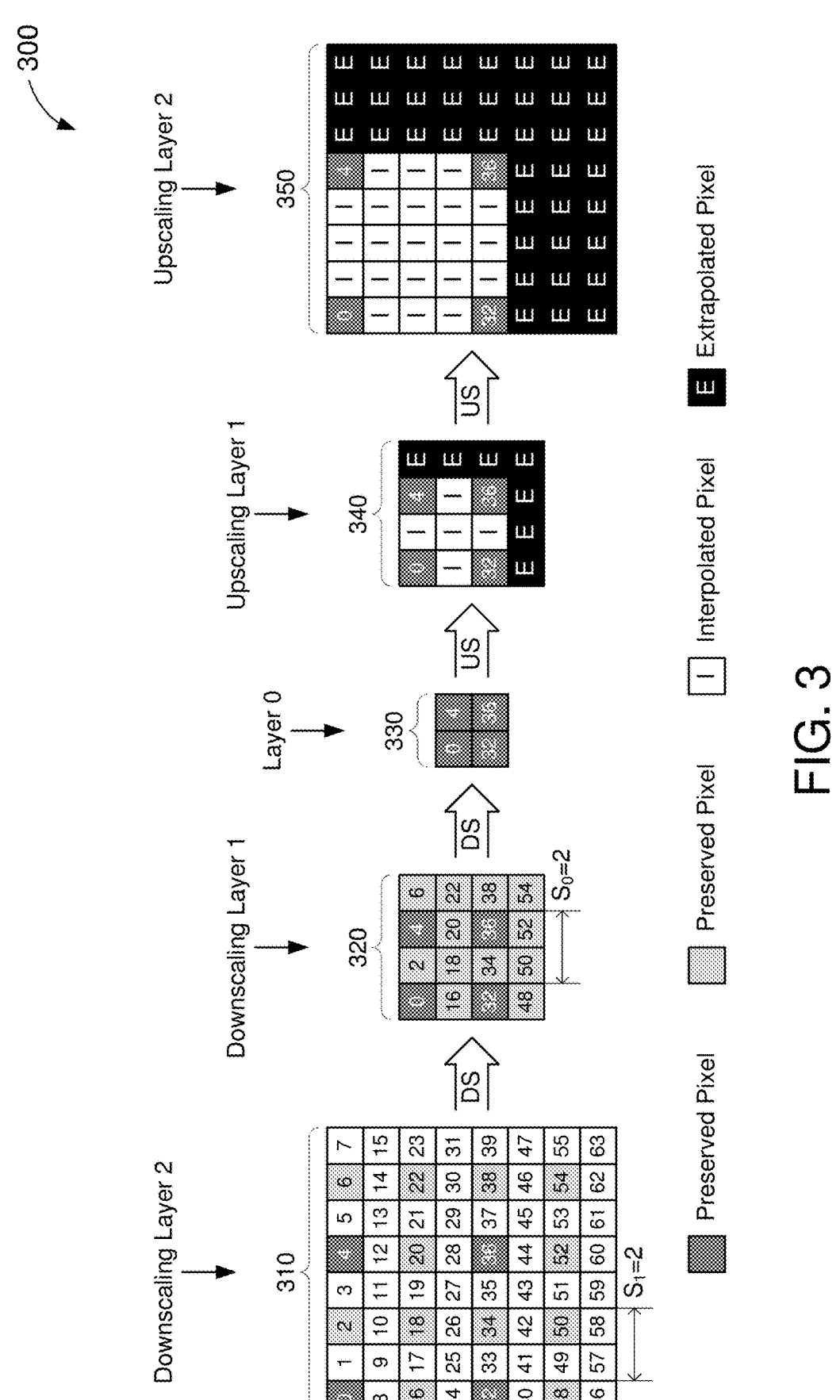
FIG. 3 shows an example image scaling operation associated with an image tile size equal to 8 and a base tile size equal to 4.

FIG. 3 shows an example image scaling operation 300 associated with an image tile size equal to 8 and a base tile size equal to 4. The image scaling operation 300 includes a downscaling (DS) operation and an upscaling (US) operation. The downscaling operation converts an image tile 310 to a downscaled tile 330 over 2 iterations, where the $k^{th}$ "layer" of the downscaling operation is inversely related to the $i^{th}$ iteration (k=2−i, for 0≤i≤2). The upscaling operation converts the downscaled tile 330 to an upscaled tile 350 over 2 iterations, where the $I^{th}$ layer of the upscaling operation is directly related to the $j^{th}$ iteration (I=j, for 0≤j≤2).

In the example of FIG. 3, the image tile 310 is an 8×8 array of pixel values (labeled 0 to 63). The $1^{st}$ iteration of the downscaling operation converts the image tile 310 to an intermediate tile 320 with a downscaling factor equal to 2 ($S_1=2$). More specifically, the $1^{st}$ iteration of the downscaling operation preserves every other (or every $2^{nd}$) pixel value of the image tile 310 to produce the intermediate tile 320. As a result, the intermediate tile 320 inherits the pixel values 0, 2, 4, 6, 16, 18, 20, 22, 32, 34, 36, 38, 48, 50, 52, and 54 from the image tile 310. Thus, the intermediate tile 320 is a 4×4 array of pixel values.

The 2 nd iteration of the downscaling operation further converts the intermediate tile 320 to the downscaled tile 330 with a downscaling factor equal to 2 ($S_0=2$). More specifically, the $2^{nd}$ iteration of the downscaling operation preservers every other (or every $2^{nd}$) pixel value of the intermediate tile 320 to produce the downscaled tile 330. As a result, the downscaled tile 330 inherits the pixel values 0, 4, 32, and 36 from the intermediate tile 320. As shown in FIG. 3, the pixel values 0, 4, 32, and 36 are located at the intersections of the $1^{st}$ and $5^{th}$ rows and the $1^{st}$ and $5^{th}$ columns of the image tile 310.

The $1^{st}$ iteration of the upscaling operation converts the downscaled tile 330 to an intermediate tile 340. More specifically, the $1^{st}$ iteration of the upscaling operation recreates a 4×4 array of pixel values (similar to the intermediate tile 320) by separating the pixel values of the downscaled tile 330 by a distance of 2. As a result, the preserved pixel values 0, 4, 32, and 36 map to the same locations in the intermediate tiles 320 and 340. The remaining pixel values of the intermediate tile 340 are reconstructed based on the preserved pixel values 0, 4, 32, and 36 from the downscaled tile 330.

As shown in FIG. 3, reconstructed pixel values that are located between two or more preserved pixel values can be interpolated (I) based on the surrounding preserved pixel values (such as above and below the reconstructed pixel value, to the left and right of the reconstructed pixel value, or any combination thereof). By contrast, any reconstructed pixel values not located between two or more preserved pixel values (such as any pixel values located in the $4^{th}$ row or the $4^{th}$ column of the intermediate tile 340) must be extrapolated (E) from the preserved pixel values above or to the left.

The $2^{nd}$ iteration of the upscaling operation converts the intermediate tile 340 to the upscaled tile 350. More specifically, the $2^{nd}$ iteration of the upscaling operation recreates an 8×8 array of pixel values (similar to the image tile 310) by further separating the pixel values of the intermediate tile 340 by a distance of 2. As a result, the preserved pixel values 0, 4, 32, and 36 map to the same locations in the image tile 310 and the upscaled tile 350. The remaining (reconstructed) pixel values of the upscaled image 350 are interpolated or extrapolated based the preserved pixel values 0, 4, 32, and 36. In the example of FIG. 3, the majority (>60%) of the pixel values in the upscaled image 350 are reconstructed via pixel extrapolation.

Figure 4:
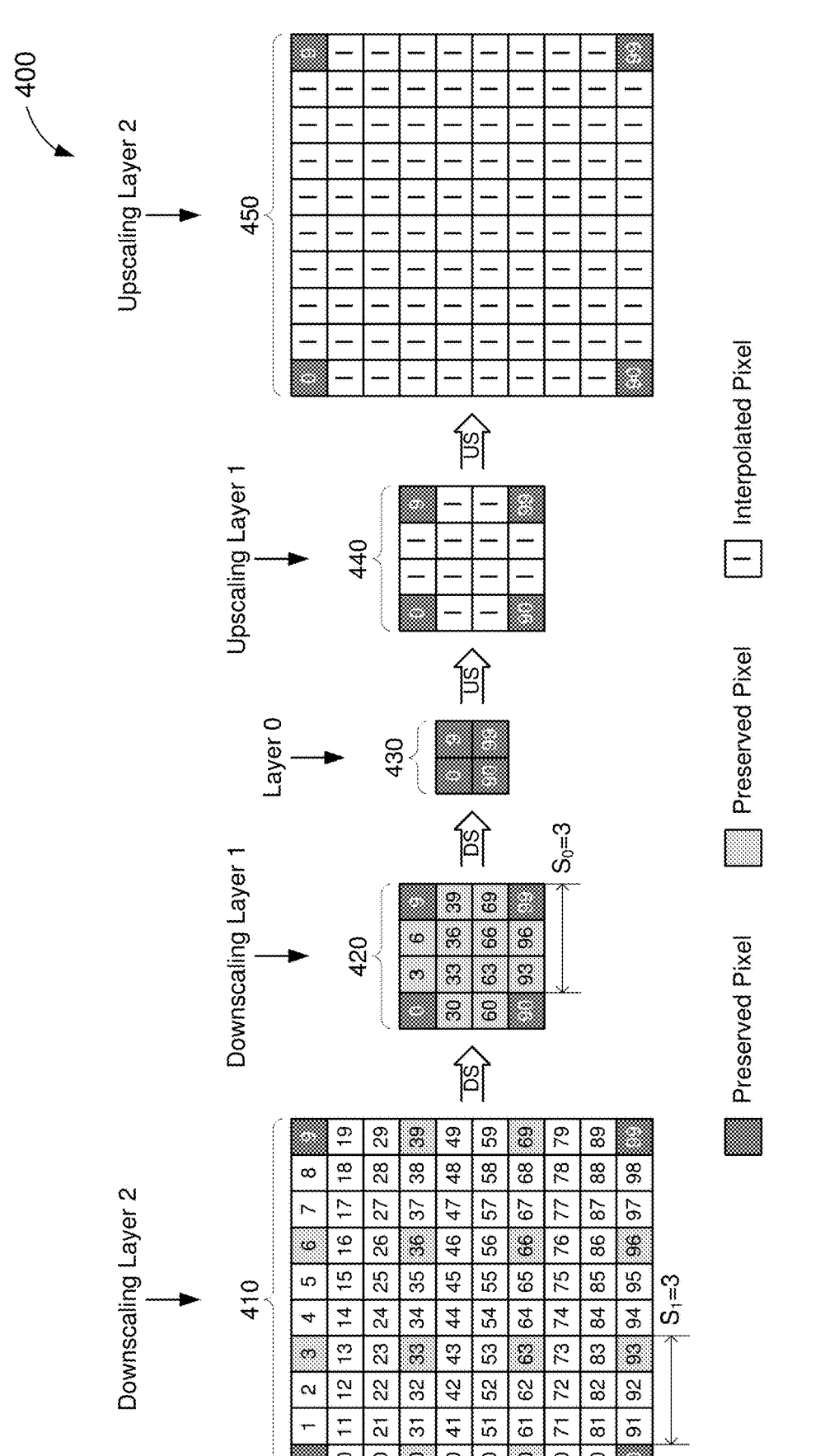
FIG. 4 shows an example image scaling operation associated with an image tile size equal to 10 and a base tile size equal to 4.

FIG. 4 shows an example image scaling operation 400 associated with an image tile size equal to 10 and a base tile size equal to 4. The image scaling operation 400 includes a downscaling (DS) operation and an upscaling (US) operation. The downscaling operation converts an image tile 410 to a downscaled tile 430 over 2 iterations, where the $k^{th}$ layer of the downscaling operation is inversely related to the $i^{th}$ iteration (k=2−i, for $0 \leq i \leq 2$). The upscaling operation converts the downscaled tile 430 to an upscaled tile 450 over 2 iterations, where the $I^{th}$ layer of the upscaling operation is directly related to the $j^{th}$ iteration (I=j, for $0 \leq j \leq 2$).

In the example of FIG. 4, the image tile 410 is a 10×10 array of pixel values (labeled 0 to 99). The $1^{st}$ iteration of the downscaling operation converts the image tile 410 to an intermediate tile 420 with a downscaling factor equal to 3 ($S_1=3$). More specifically, the $1^{st}$ iteration of the downscaling operation preserves every $3^{rd}$ pixel value of the image tile 410 to produce the intermediate tile 420. As a result, the intermediate tile 420 inherits the pixel values 0, 3, 6, 9, 30, 33, 36, 39, 60, 63, 66, 69, 90, 93, 96, and 99 from the image tile 410. Thus, the intermediate tile 420 is a 4×4 array of pixel values.

The $2^{nd}$ iteration of the downscaling operation further converts the intermediate tile 420 to the downscaled tile 430 with a downscaling factor equal to 3 ($S_0=3$). More specifically, the $2^{nd}$ iteration of the downscaling operation preservers every $3^{rd}$ pixel value of the intermediate tile 420 to produce the downscaled tile 430. As a result, the downscaled tile 430 inherits the pixel values 0, 9, 90, and 99 from the intermediate tile 420. As shown in FIG. 4, the pixel values 0, 9, 90, and 99 are located at the intersections of the $1^{st}$ and $10^{th}$ rows and the $1^{st}$ and $10^{th}$ columns of the image tile 410.

The $1^{st}$ iteration of the upscaling operation converts the downscaled tile 430 to an intermediate tile 440. More specifically, the $1^{st}$ iteration of the upscaling operation recreates a 4×4 array of pixel values (similar to the inter-mediate tile 420) by separating the pixel values of the downscaled tile 430 by a distance of 3. As a result, the preserved pixel values 0, 9, 90, and 99 map to the same locations in the intermediate tiles 420 and 440. Because the preserved pixel values 0, 9, 90, and 99 are located at the corners of the intermediate tile 440, all of the remaining pixel values of the intermediate tile 440 can be interpolated based on two or more of the preserved pixel values.

The $2^{nd}$ iteration of the upscaling operation converts the intermediate tile 440 to the upscaled tile 450. More specifically, the $2^{nd}$ iteration of the upscaling operation recreates a 10×10 array of pixel values (similar to the image tile 410) by further separating the pixel values of the intermediate tile 440 by a distance of 3. As a result, the preserved pixel values 0, 9, 90, and 99 map to the same locations in the image tile 410 and the upscaled tile 450. Because the preserved pixel values 0, 9, 90, and 99 are located at the corners of the upscaled tile 450, all of the remaining pixel values of the upscaled tile 450 can be interpolated based on two or more of the preserved pixel values.

As shown in the examples of FIGS. 3 and 4, the image tile size, base tile size, and scaling factors associated with an image scaling operation affect the locations of preserved pixel values in an upscaled tile. This, in turn, affects the number of reconstructed pixel values that can be interpolated from two or more preserved pixel values in the upscaled tile. Aspects of the present disclosure recognize that, for any given set of image scaling parameters (such as base tile size, number of iterations, and scaling factors), an optimal image tile size can be selected such that all of the reconstructed pixel values in an upscaled tile can be interpolated based on two or more preserved pixel values. For example, the optimal image tile size may cause a downscaled tile to inherit preserved pixel values from all 4 corners of an original image tile as a result of the downscaling operation (such as shown in FIG. 4).

Figure 5:
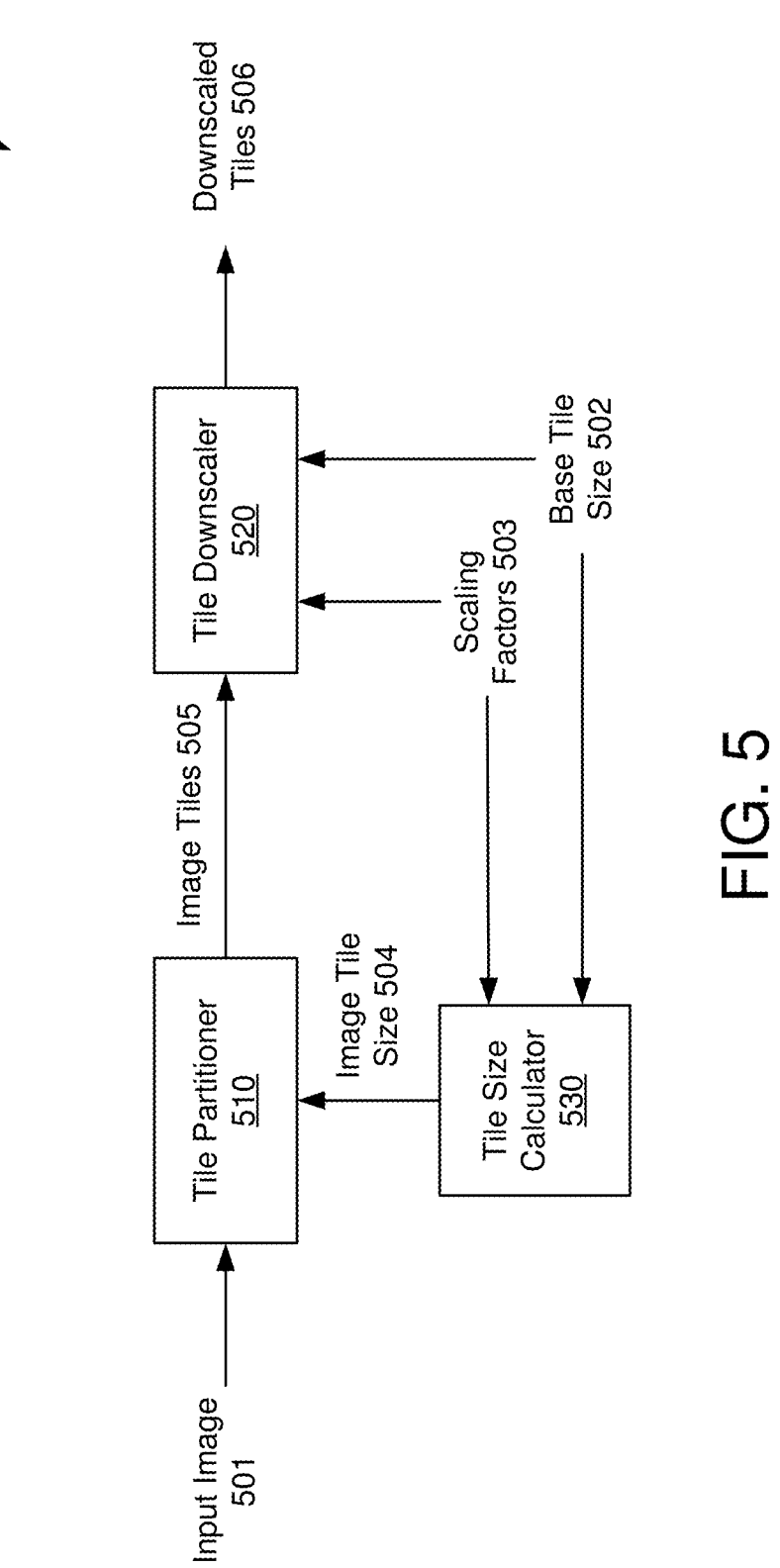
FIG. 5 shows a block diagram of an example image downscaling system, according to some implementations.

FIG. 5 shows a block diagram of an example image downscaling system 500, according to some implementations. In some implementations, the image downscaling system 500 may be one example of the image encoder 210 of FIG. 2. More specifically, the image downscaling system 500 may be configured to convert an input image 501 into a set of downscaled tiles 506 based on a base tile size 502 and one or more scaling factors 503 associated with a downscaling operation. With reference for example to FIG. 2, the input image 501 may be one example of the raw image data 201 and each of the downscaled tiles 506 may be one example of any of the downscaled tiles 203.

The image downscaling system 500 includes a tile partitioner 510, a tile downscaler 520, and a tile size calculator 530. In some implementations, the tile partitioner 510 and the tile downscaler 520 may be examples of the tile partitioning component 212 and the tile downscaling component 214, respectively, of FIG. 2. More specifically, the tile partitioner 510 is configured to partition the input image 501 into a number of image tiles 505 and the tile downscaler 520 is configured to perform the downscaling operation on the image tiles 505 to produce the downscaled tiles 506. In some implementations, the tile downscaler 520 may perform the downscaling operation over multiple iterations, where each iteration is associated with a respective scaling factor 503 (such as described with reference to FIGS. 3 and 4).

In some implementations, the tile size calculator 530 may determine an image tile size 504 for the image tiles 505 based on the base tile size 502 and the scaling factors 503 associated with the downscaling operation. More specifically, the tile size calculator 530 may select an image tile size 504 that allows all reconstructed pixel values in each upscaled tile (such as the upscaled tiles 206 of FIG. 2) to be interpolated based on two or more preserved pixel values from each image tile 505 (such as shown in FIG. 4). For example, the image tile size 504 may be calculated as a function (y) of the base tile size (x), the number (K) of iterations, and the scaling factor (S$_j$) associated with each iteration of the downscaling operation, where y represents the length of one side (such as a row or column) of an image tile 505 and x represents the length of one side of a downscaled tile 506:

$$y = \left(\prod_{j=0}^{K-1} S_j\right)(x - 1) + 1$$

The equation above can be further modified to indicate a side length (z) of an intermediate tile associated with the L$^{th}$ layer of the downscaling operation:

$$z = \left(\prod_{j=0}^{L-1} S_j\right)(x - 1) + 1$$

In some implementations, the tile partitioner 510 may partition the input image 501 into image tiles 505 having dimensions equal to, or indicated by, the image tile size 504 (such as the image tile 410 of FIG. 4). In the example of FIG. 4, the image tile 410 and the downscaled tile 430 are depicted as square tiles. However, in actual implementations, the equations above can be used to determine an optimal image tile size 504 for image tiles 505 having any dimensions (including rectangular image tiles). Further, the image tile size 504 may allow all of the reconstructed pixel values in an upscaled tile to be interpolated based on two or more preserved pixel values from an image tile 505 even if the scaling factors associated with the upscaling operation are different than the scaling factors associated with the downscaling operation.

The tile downscaler 520 uses the base tile size 502 and scaling factors 503 to convert the image tiles 505 to the downscaled tiles 506. For example, the tile downscaler 520 may perform the downscaling operation described with reference to FIG. 4. Because the tile downscaler 520 uses the same downscaling parameters (such as the base tile size 502 and the scaling factors 530) used by the tile size calculator 530 to determine the image tile size 504, each of the downscaled tiles 506 inherits a subset of preserved pixel values from a respective image tile 505 that includes at least the pixel values located at the corners of the image tile 505 (such as the pixel values 0, 9, 90, and 99 of FIG. 4). As a result, when a downscaled tile 506 is upscaled back to its native resolution, all of the reconstructed pixel values in the upscaled tile can be interpolated based on two or more of the preserved pixel values in the downscaled tile 506.

Figure 6:
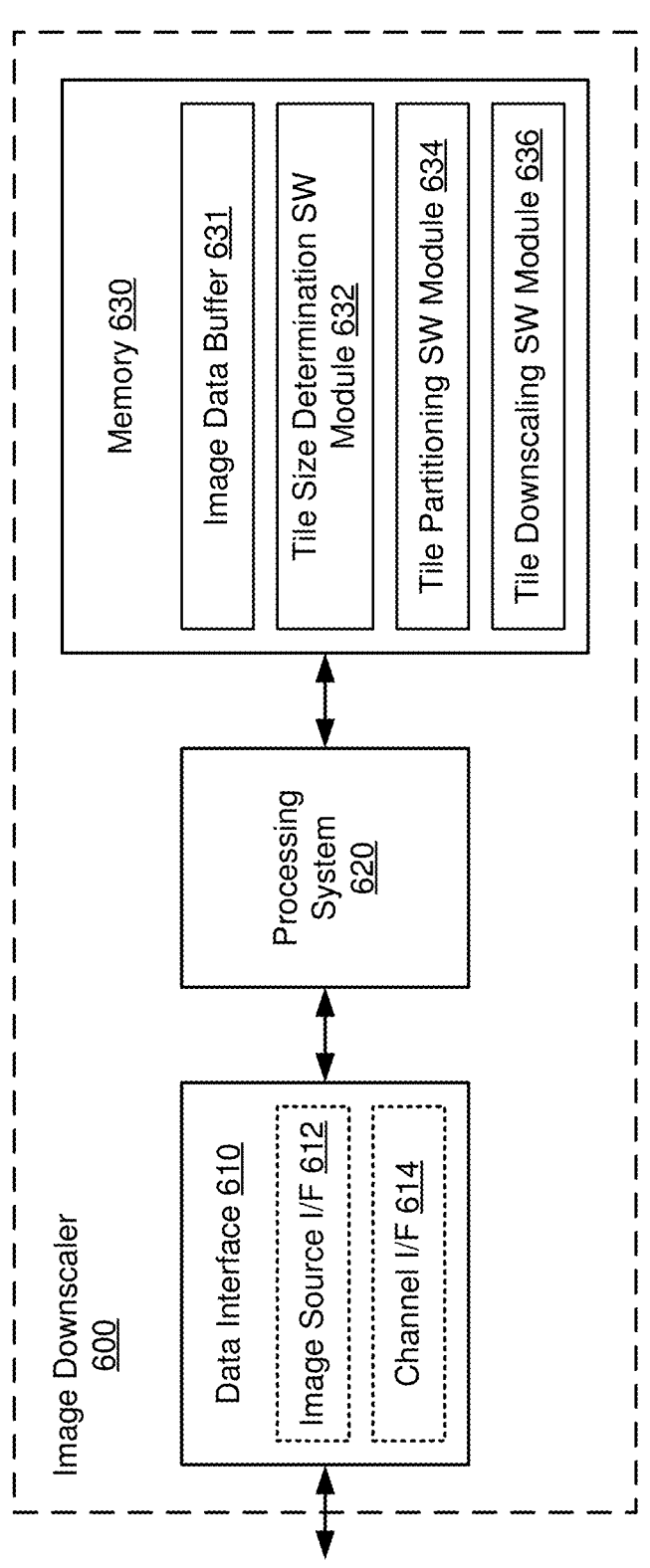
FIG. 6 shows a block diagram of an example image downscaler, according to some implementations.

FIG. 6 shows a block diagram of an example image downscaler 600, according to some implementations. In some implementations, the image downscaler 600 may be one example of the image encoder 210 of FIG. 2 or the image downscaling system 500 of FIG. 5. More specifically, the image downscaler 600 may be configured to convert an input image into a set of downscaled tiles.

In some implementations, the image downscaler 600 may include a data interface 610, a processing system 620, and a memory 630. The data interface 610 is configured to receive image data representing the input image from an image source and output codewords representing the downscaled tiles to a communication channel. In some aspects, the data interface 610 may include an image source interface (I/F) 612 to interface with the image source and a channel interface 614 to interface with the communication channel. In some implementations, the channel interface 814 may transmit a plurality of downscaled tiles to an image upscaler.

The memory 630 may include an image data buffer 631 to store the image data or any intermediate data associated with a downscaling operation. The memory 630 also may include a non-transitory computer-readable medium (including one or more nonvolatile memory elements, such as EPROM, EEPROM, Flash memory, a hard drive, and the like) that may store at least the following software (SW) modules:

a tile size determination SW module 632 to determine an image tile size based at least in part on a base tile size associated with the downscaling operation;

a tile partitioning SW module 634 to partition the input image into a plurality of tiles so that a size of each tile of the plurality of tiles is equal to the image tile size; and a tile downscaling SW module 636 to downscale each tile of the plurality of tiles based on the downscaling operation so that a size of each downscaled tile of the plurality of downscaled tiles is equal to the base tile size.

Each software module includes instructions that, when executed by the processing system 620, causes the image downscaler 600 to perform the corresponding functions.

The processing system 620 may include any suitable one or more processors capable of executing scripts or instructions of one or more software programs stored in the image downscaler 600 (such as in the memory 630). For example, the processing system 620 may execute the tile size determination SW module 632 to determine an image tile size based at least in part on a base tile size associated with the downscaling operation. The processing system 620 may further execute the tile partitioning SW module 634 to partition the input image into a plurality of tiles so that a size of each tile of the plurality of tiles is equal to the image tile size. Still further, the processing system 620 may execute the tile downscaling SW module 636 to downscale each tile of the plurality of tiles based on the downscaling operation so that a size of each downscaled tile of the plurality of downscaled tiles is equal to the base tile size.

FIG. 7 shows an illustrative flowchart depicting an example operation 700 for downscaling images, according to some implementations. In some implementations, the example operation 700 may be performed by an image downscaler such as the image encoder 210 of FIG. 2 or the image downscaling system 500 of FIG. 5.

The image downscaler determines an image tile size based at least in part on a base tile size associated with a downscaling operation (710). The image downscaler partitions an image into a plurality of tiles so that a size of each tile of the plurality of tiles is equal to the image tile size (720). The image downscaler downscales each tile of the plurality of tiles based on the downscaling operation so that a size of each downscaled tile of the plurality of downscaled tiles is equal to the base tile size (730). The image downscaler transmits the plurality of downscaled tiles to an image upscaler (740).

In some aspects, the downscaling operation may transform an array of first pixel values arranged in a number (N) of rows or N columns into an array of second pixel values arranged in a number (M) of rows or M columns, respectively, where M<N, and where the array of first pixel values represents one of the plurality of tiles and the array of second pixel values represents one of the plurality of downscaled tiles. In some implementations, the downscaling operation may preserve a subset of the first pixel values so that each of the second pixel values is equal to a respective one of the first pixel values in the subset. In some implementations, the subset of first pixel values may include the first pixel values located at the intersections of the $1^{st}$ row and the $1^{st}$ column, the $1^{st}$ row and the $N^{th}$ column, the $N^{th}$ row and the $1^{st}$ column, and the $N^{th}$ row and the $N^{th}$ column of the array of first pixel values.

In some implementations, the image tile size may be further determined based on a scaling factor associated with the downscaling operation that indicates which of the first pixel values are preserved as a result of the downscaling operation. In some implementations, the scaling factor may indicate a distance between the preserved pixel values in each of the N rows and in each of the N columns of the array of first pixel values.

In some aspects, the downscaling operation may be performed over a number (K) of iterations so that the $K^{th}$ iteration of the downscaling operation produces the array of second pixel values and the $i^{th}$ iteration of the downscaling operation produces an array of third pixel values arranged in a number (L) of rows and L columns, where 0<i<K and M<L<N. In some implementations, each of the K iterations of the downscaling operation may preserve a respective subset of the first pixel values so that each of the third pixel values is equal to a respective one of the first pixel values and each of the second pixel values is equal to a respective one of the third pixel values.

In some implementations, the image tile size may be further determined based on a respective scaling factor ($S_j$) associated with each of the K iterations of the downscaling operation, where the scaling factor $S_j$ indicates a distance between the pixel values preserved by the $(K-j)^{th}$ iteration of the downscaling operation, and where 0≤K≤−1. In some implementations, the image downscaler may further determine the number N based on the number M and the scaling factors $S_j$ associated with K iterations of the downscaling operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of downscaling images, comprising:
   determining an image tile size based at least in part on a base tile size and one or more scaling factors associated with a downscaling operation;
   partitioning an image into a plurality of initial tiles so that a size of each initial tile of the plurality of initial tiles is equal to the image tile size;
   downscaling each initial tile of the plurality of initial tiles into a respective downscaled tile based on the downscaling operation and the one or more scaling factors so that a plurality of pixel values in the initial tile are preserved as a result of the downscaling and a size of the downscaled tile is equal to the base tile size, the one or more scaling factors indicating a distance between pixel values of the plurality of pixel values; and
   transmitting each of the downscaled tiles to an image upscaler.

2. The method of claim 1, wherein the downscaling operation transforms an array of first pixel values arranged in a number (N) of rows and columns into an array of second pixel values arranged in a number (M) of rows and columns, where M<N, the array of first pixel values representing one of the plurality of initial tiles and the array of second pixel values representing one of the plurality of downscaled tiles.

3. The method of claim 2, wherein the downscaling operation preserves a subset of the first pixel values so that each of the second pixel values is equal to a respective one of the first pixel values in the subset.

4. The method of claim 3, wherein the subset of first pixel values includes the first pixel values located at the intersections of the $1^{st}$ row and the $1^{st}$ column, the $1^{st}$ row and the $N^{th}$ column, the $N^{th}$ row and the $1^{st}$ column, and the $N^{th}$ row and the $N^{th}$ column of the array of first pixel values.

5. The method of claim 3, wherein the scaling factor indicates which of the first pixel values are preserved as a result of the downscaling operation.

6. The method of claim 5, wherein the scaling factor indicates a distance between the preserved pixel values in each of the N rows and in each of the N columns of the array of first pixel values.

7. The method of claim 2, wherein the downscaling operation is performed over a number (K) of iterations so that the $K^{th}$ iteration of the downscaling operation produces the array of second pixel values and the $i^{th}$ iteration of the downscaling operation produces an array of third pixel values arranged in a number (L) of rows and L columns, where 0<i<K and M<L<N.

8. The method of claim 7, wherein each of the K iterations of the downscaling operation preserves a respective subset of the first pixel values so that each of the third pixel values is equal to a respective one of the first pixel values and each of the second pixel values is equal to a respective one of the third pixel values.

9. The method of claim 8, wherein the image tile size is further determined based on a respective scaling factor ($S_j$) associated with each of the K iterations of the downscaling operation, the scaling factor $S_j$ indicating a distance between the pixel values preserved by the $(K-j)^{th}$ iteration of the downscaling operation, where $0 \le j \le K-1$.

10. The method of claim 9, wherein the determining of the image tile size comprises:

determining the number N based on the number M and the scaling factors $S_j$ associated with K iterations of the downscaling operation.

11. An image downscaler comprising:

a processing system; and a memory storing instructions that, when executed by the processing system, causes the image downscaler to:

determine an image tile size based at least in part on a base tile size and one or more scaling factors associated with a downscaling operation;

partition an image into a plurality of initial tiles so that a size of each initial tile of the plurality of initial tiles is equal to the image tile size;

downscale each initial tile of the plurality of initial tiles into a respective downscaled tile based on the downscaling operation and the one or more scaling factors so that a plurality of pixel values in the initial tile are preserved as a result of the downscaling and a size of the downscaled tile is equal to the base tile size, the one or more scaling factors indicating a distance between pixel values of the plurality of pixel values; and transmit each of the downscaled tiles to an image upscaler.

12. The image downscaler of claim 11, wherein the downscaling operation transforms an array of first pixel values arranged in a number (N) of rows and columns into an array of second pixel values arranged in a number (M) of rows and columns, where M<N, the array of first pixel values representing one of the plurality of initial tiles and the array of second pixel values representing one of the plurality of downscaled tiles.

13. The image downscaler of claim 12, wherein the downscaling operation preserves a subset of the first pixel values so that each of the second pixel values is equal to a respective one of the first pixel values in the subset.

14. The image downscaler of claim 13, wherein the subset of first pixel values includes the first pixel values located at the intersections of the $1^{st}$ row and the $1^{st}$ column, the $1^{st}$ row and the $N^{th}$ column, the $N^{th}$ row and the $1^{st}$ column, and the $N^{th}$ row and the $N^{th}$ column of the array of first pixel values.

15. The image downscaler of claim 13, wherein the scaling factor indicates which of the first pixel values are preserved as a result of the downscaling operation.

16. The image downscaler of claim 15, wherein the scaling factor indicates a distance between the preserved pixel values in each of the N rows and in each of the N columns of the array of first pixel values.

17. The image downscaler of claim 12, wherein the downscaling operation is performed over a number (K) of iterations so that the $K^{th}$ iteration of the downscaling operation produces the array of second pixel values the and the $i^{th}$ iteration of the downscaling operation produces an array of third pixel values arranged in a number (L) of rows and L columns, where 0<i<K and M<L<N.

18. The image downscaler of claim 17, wherein each of the K iterations of the downscaling operation preserves a respective subset of the first pixel values so that each of the third pixel values is equal to a respective one of the first pixel values and each of the second pixel values is equal to a respective one of the third pixel values.

19. The image downscaler of claim 18, wherein the image tile size is further determined based on a respective scaling factor ($S_j$) associated with each of the K iterations of the downscaling operation, the scaling factor $S_j$ indicating a distance between the pixel values preserved by the $(K-j)^{th}$ iteration of the downscaling operation, where $0 \le j \le K-1$.

20. The image downscaler of claim 19, wherein the determining of the image tile size comprises:

determining the number N based on the number M and the scaling factors $S_j$ associated with K iterations of the downscaling operation.

\* \* \* \* \*